United States Patent
Giessibl

(10) Patent No.: US 7,665,350 B2
(45) Date of Patent: Feb. 23, 2010

(54) SURFACE SCANNING METHOD

(76) Inventor: Franz Josef Giessibl, Mergenthauer Weg 72, Friedberg (DE) 86316

(*) Notice: Subject to any disclaimer, the term of this patent is extended or adjusted under 35 U.S.C. 154(b) by 366 days.

(21) Appl. No.: 11/568,199

(22) PCT Filed: Apr. 14, 2005

(86) PCT No.: PCT/DE2005/000674

§ 371 (c)(1),
(2), (4) Date: Oct. 23, 2006

(87) PCT Pub. No.: WO2005/104137

PCT Pub. Date: Nov. 3, 2005

(65) Prior Publication Data

US 2008/0295583 A1 Dec. 4, 2008

(30) Foreign Application Priority Data

Apr. 22, 2004 (DE) .................. 10 2004 019 608

(51) Int. Cl.
*G01B 5/28* (2006.01)
(52) U.S. Cl. ........................ 73/105; 116/275
(58) Field of Classification Search ............ 73/105; 116/275
See application file for complete search history.

(56) References Cited

U.S. PATENT DOCUMENTS 5,804,709 A * 9/1998 Bourgoin et al. ............ 73/105
6,823,724 B1 * 11/2004 Kobayashi et al. .......... 73/105
6,906,450 B2 * 6/2005 Tamayo De Miguel et al. ......... 310/317
6,935,167 B1 * 8/2005 Sahin et al. ................ 73/105
7,107,825 B2 9/2006 Degertekin et al.

OTHER PUBLICATIONS

Frequency Modulation Detection Using High-Q Cantilevers for Enhanced Force Microscope Sensitivity, T.R. Albrecht et al., Journal of Applied Physics, 69 (Jan. 15, 1991), No. 2, pp. 668-673.
Advances in Atomic Force Microscopy, Franz J. Giessibl, Reviews of Modern Physics, vol. 75, No. 3, Jul. 2003, pp. 949-983.
Interaction Sensing in Dynamic Force Microscopy, U Dürig, New Journal of Physics 2, (2000) 5.1-5.12.

(Continued)

*Primary Examiner*—Hezron Williams
*Assistant Examiner*—Rodney T Frank
(74) *Attorney, Agent, or Firm*—David S. Safran; Roberts Mlotkowski Safran & Cole, P.C.

(57) ABSTRACT

The invention relates to a dynamic-mode surface (12) scanning method in which a cantilever (10) provided with a probe (18) is non-positively coupled to the surface and is made to oscillate in a resonant fashion using positive feedback, wherein the resonant oscillation contains at least one higher harmonic whose frequency represents an integer multiple of the basic resonance frequency of the cantilever which is force-coupled to the surface. According to the invention, the amplitude or the phases of the at least one higher harmonic oscillation is determined as a control variable in order to regulate the distance between the probe (18) and the surface (14).

17 Claims, 2 Drawing Sheets

OTHER PUBLICATIONS

Figure 1:
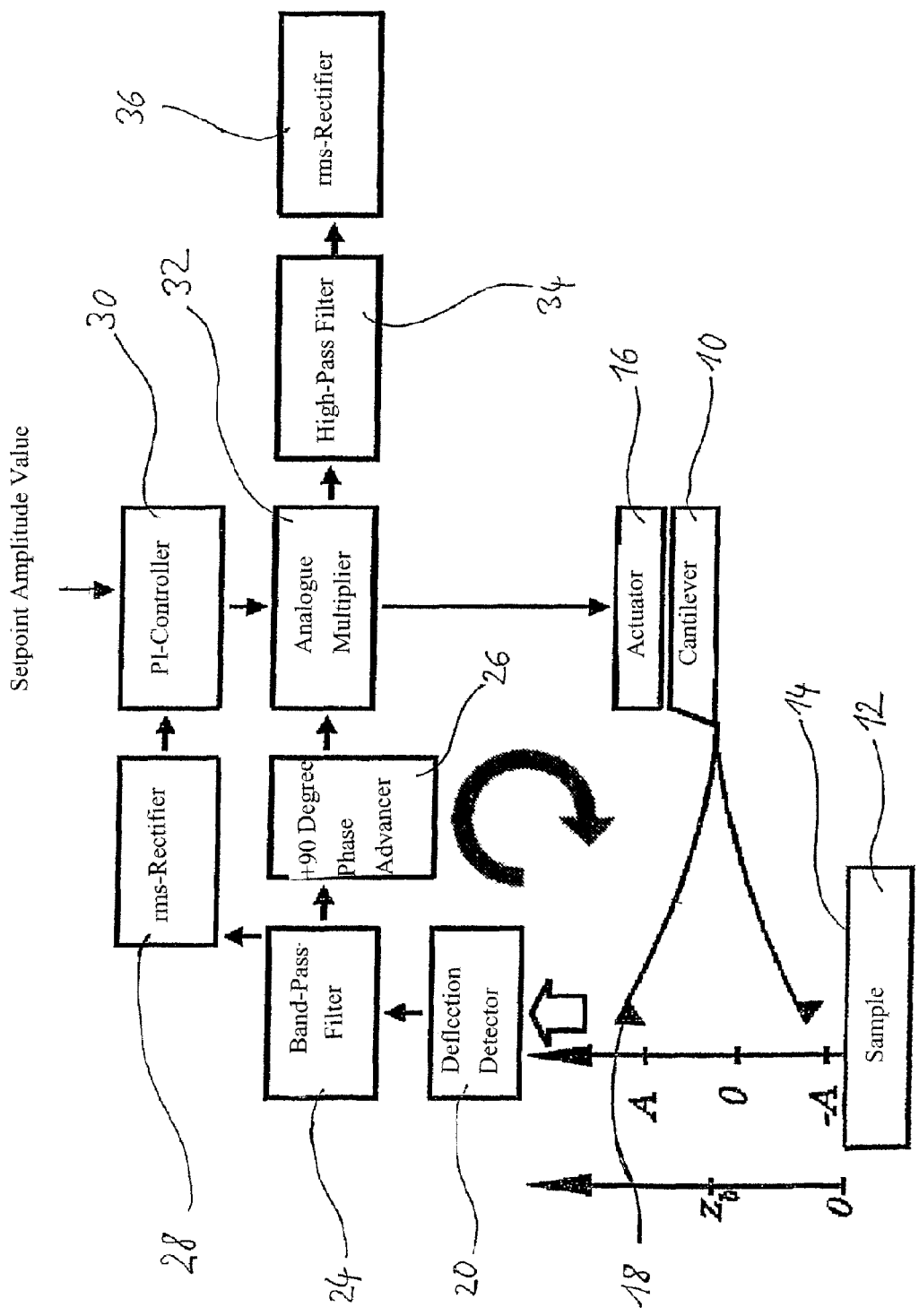

Higher Harmonics Imaging in Tapping-Mode Atomic-Force Microscopy, Robert W. Stark and Wolfgang M. Heckl, Rev. Sc. Instrum. 74, (2003) American Institute of Physics, pp. 5111-5114.

Higher-Harmonics Generation in Tapping-Mode Atomic-Force Microscopy: Insights Into the Tip-Sample Interaction, R. Hillenbrand et al., Appl. Phys. Lett., 2000 American Institute of Physics, pp. 3478-3480.

Mapping Electrostatic Forces Using Higher Harmonics Tapping Mode Atomic Force Microscopy in Liquid, S. John T. Van Noort et al., Langmuir, 1999 American Chemical Society, pp. 7101-7107.

Spectroscopy of Higher Harmonics in Dynamic Atomic Force Microscopy, Robert W. Stark, Institute of Physics Publishing, Nanotechnology 15 (2004), pp. 347-351.

Ultrasonic Atomic Force Microscope With Overtone Excitation of Cantilever, Kazushi Yamanaka and Shizuka Nakano, Jpn. J. Appl. Phys., vol. 35, (1996), pp. 3787-3792.

Tip Motion in Amplitude Modulation (Tapping-Mode) Atomic-Force Microscopy: Comparison Between Continuous and Point-Mass Models, Tomas R. Rodriquez and Ricardo Garcia, Appl. Phys. Lett. 80, 2002 American Institute of Physics, pp. 1646-1648.

* cited by examiner

SURFACE SCANNING METHOD

The present invention relates to a method for scanning a surface in a dynamic mode, wherein a cantilever provided with a probe is force-coupled to the surface and is made to oscillate in a resonant fashion using positive feedback, and wherein the resonant oscillation contains at least one higher harmonic whose frequency represents an integer multiple of the basic resonance frequency of the cantilever which is force-coupled to the surface. The invention is also directed to a method for scanning a surface in a dynamic mode, wherein a cantilever provided with a probe is force-coupled to the surface and is made to oscillate in a fashion that the oscillation contains at least one higher harmonic oscillation by excitation by means of an oscillation generator exciting at a fixed frequency between the frequency of the basic resonance oscillation minus the frequency of the basic resonance oscillation divided by the Q-factor of the cantilever and the frequency of the basic resonance oscillation plus the frequency of the basic resonance oscillation of the free cantilever divided by the Q-factor of the cantilever, said at least one higher harmonic oscillation having a frequency which is an integer multiple of the excitation frequency of the oscillation generator.

Such methods and corresponding devices for scanning surfaces, for example, for determining the surface topography, are known from profilometry and force microscopy. In force microscopy a probe, usually a pointed tip fixed at a cantilever, is moved across a surface. In scanning force microscopy the sample surface is scanned in two directions (x, y) and a force between the tip and the probe surface is recorded as the measured variable. The force microscopes may be operated in two different modes of operation, namely on the one hand in a static mode (also called contact mode) and on the other hand in a dynamic mode (non-contact mode).

In the static mode the interaction between the force tip and the sample surface is directly transformed into a deflection of a cantilever at which the tip is fixed, and this deflection is measured. Since the deflection of the cantilever should be larger than the deformation of the tip and the sample, there results a significant restriction of the usable spring constant of such cantilevers, which restriction consists in the fact that in the static mode the cantilever should be significantly softer than the tip and the sample. Due to other boundary conditions there are further restrictions for this method, so that it can be used only in certain cases. However, for a static scanning force microscope already atomic resolution has been demonstrated.

Scanning of the sample surface in the dynamic operation mode according to the prior art in turn occurs in two different manners, namely the amplitude modulation technique and the frequency modulation technique.

According to the amplitude modulation technique the cantilever is exited, for example, by a frequency generator at a constant frequency close to the basic resonance frequency of the free measuring system consisting of the cantilever and a tip fixed thereto. The basic resonance frequency is the basic fundamental frequency (first fundamental frequency) of the cantilever including the tip without interaction with a sample. Since on the one hand the resonance frequency of the cantilever upon presence of a sample surface and due to interaction via the tip with this sample surface is shifting, while the excitation frequency is maintained constant, both the amplitude of the oscillation and the phase between excitation and deflection of the cantilever changes. The changes are the larger, the stronger the tip comes into interaction with the sample surface, and hence they depend on the distance between the sample and the tip. Thus, the change of the oscillation amplitude and/or the phase between excitation and deflection of the cantilever can be used as a measure for the interaction and hence for the distance between the tip and the sample, and consequently it can be also used for imaging the surface topography. This in most cases occurs by maintaining constant, via a feedback control loop which varies the distance between sample and tip, the oscillation amplitude and hence the distance. A drawback of this amplitude modulation technique (AM), however, resides in the fact that the change of, for example, the amplitude in the AM mode does not occur instantaneously as soon as the interaction between the tip and the sample changes, but rather it occurs due to the high Q-factors only with a relatively long time constant. Consequently, a scanning force microscope operating in the AM mode, in particular under vacuum, is very slow.

This drawback of the reduced bandwidth during operation in the AM mode can be circumvented by operation in the so-called frequency modulation mode (FM). With the frequency modulation method the cantilever is not exited at a constant frequency, but rather resonant oscillation with variable frequency is exited by positive feedback. The frequency shift which is generated by different distances between the tip and the sample surface, and hence by differently strong interaction between the sample surface and the tip, is measured and it reflects the distance between the tip and the sample surface. In most cases the scanning force microscopes are then operated in the FM mode in such a manner that the corresponding measured variable, such as the frequency shift of the oscillation and hence in turn the distance between the tip and the sample surface, is maintained constant. Operation of a scanning force microscope in the FM mode is described, for example, by T. R. Albrecht et al. in the Journal of Applied Physics, 69 (2), page 668-673, of Jan. 15, 1991.

A general overview on the development of the scanning force microscopy is found, for example, in the article "Advances in Atomic Force Microscopy" of F.-J. Giessibl in Reviews of Modern Physics, Vol. 75, No. 3, Jul. 2003, pages 949-983.

According to US 2004/0020279 a cantilever of a force microscope operating in the AM mode is excited by a radio frequency signal which is modulated by a frequency up to the fifth overtone of the cantilever resonance frequency to an oscillation at or close to its resonance frequency.

In an article of U. Dürig in New Journal of Physics 2, 5.1-5.12, 2000, recording of higher harmonic oscillations of the cantilever was proposed for determining the interaction potential, however not for the purpose of feedback control of the distance between the tip and the sample.

In R. W. Stark and W. M. Heckl: "Higher Harmonics Imaging in Tapping-Mode Atomic Force Microscopy" Rev. Sci. Instrum. 74, pages 5111-5114 (2003) a method for scanning a surface is described, wherein a scanning force microscope is operated in the "tapping mode" and wherein higher harmonic oscillations of the probe induced by the non-linear contact between the probe tip and the sample surface are used for imaging the scanned sample surface. The amplitudes of the higher harmonics are determined by a separate lock-in amplifier and are evaluated. In the "tapping-mode" the probe tip during each oscillation cycle interacts once with the sample surface, wherein the distance between the probe tip and the sample surface is selected such that repulsive forces occur.

In R. Hillenbrand, M. Stark and R. Guckenberger: "Higher-Harmonics Generation in Tapping-Mode Atomic-Force Microscopy: Insights into the Tip-Sample Interaction", Appl. Phys. Lett. 76, pages 3478-3480 (2000) a similar method is described, wherein also here the amplitudes of higher harmonics induced by the non-linear interaction between tip and sample are used for imaging the sample surface.

In S. J. T. van Noort, O. H. Willemsen, K. O. van der Werf, B. G. de Grooth and J. Grefe: "Mapping Electrostatic Forces Using Higher Harmonics Tapping Mode Atomic Force Microscopy in Liquid", Langmuir, 1999, 15, pages 7101-7107, it is shown in a model in which the movement of the probe tip is described by a damped harmonic oscillator that the amplitudes of the higher harmonics are sensitive to electrostatic interactions. The scanning force microscope is operated in a "tapping mode" in a fluid.

In R. W. Stark: "Spectroscopy of Higher Harmonics in Dynamic Atomic Force Microscopy", Nanotechnology 15, pages 347-351 (March 2004) the oscillation of the cantilever of a scanning force microscope in the "tapping mode" is described by a numerical model, wherein also higher harmonics are considered.

In K. Yamanaka and S. Nakano: "Ultrasonic Atomic Force Microscope with Overtone Excitation of Cantilever", Jpn. J. Appl. Phys. 35, pages 3787-3792 (1996) a scanning force microscope is described which operates with ultrasonic excitation and which utilizes amplitudes and resonance frequencies of overtones of the cantilever.

In T. R. Rodriguez and R. Garcia: "Tip Motion in Amplitude Modulation (tapping mode) Atomic-Force Microscopy: Comparison between Continuous and Point-Mass Models", Appl. Phys. Lett. 80, pages 1646-1648 (2002) a model for the description of the movement of the probe tip of a scanning force microscope in the tapping mode is described, wherein it is stated that for standard operation conditions higher harmonics should be weaker by about three orders of magnitude than the basic oscillation.

The "higher harmonic oscillations" (hereinafter also labelled "higher harmonics") are oscillations of the cantilever at frequencies $f_n$ corresponding to an integer multiple ($n \times f_0$) of the frequency $f_0$ of the basic resonance of the cantilever. The occurrence of higher harmonics is caused by an anharmonicity of the potential so that higher harmonics occur only if the tip of the cantilever interacts with the sample. The "overtones" of the cantilever, however, are natural oscillations which are determined by the geometry of the cantilever and which have nothing to do with the anharmonicity of the potential. Consequently, the overtones also may be exited for a non-interacting, i.e. free, cantilever. For a beam restrained at one end and having a constant cross section the first overtone (i.e. the second natural oscillation), for example, has a frequency of $6.27 \times f_0$, and the second overtone (i.e. the third natural oscillation) has a frequency of about $17.55 \times f_0$.

A drawback both of the AM technique and the FM technique is the dependency of the control signal on long-range forces, which do not result from the tip atom closest to the surface to be examined but rather from thousands of tip atoms. This results in a limitation of the spatial resolution. For the FM technique this drawback may be reduced by using very small oscillation amplitudes, however, still the drawback of a non-monotonic control signal remains. This means that when the oscillating tip approaches the surface to be examined the frequency first decreases due to the attractive interaction and then at small distances increases again due to the repulsive interaction between the tip and the sample surface. One thus obtains a non-monotonic control signal which may result in the destruction of the tip, since the distance control drives the tip into the sample when looking for a seemingly lower oscillation frequency. This drawback, however, may be mitigated by, for example, triggering a withdrawal signal when the distance is lower than a minimum distance or by rectifying the frequency shift signal and by excitation with constant excitation amplitude; however, also these methods result in discontinuities in the control characteristic and in instabilities.

It is an object of the present invention to provide for a method which overcomes the above-mentioned drawbacks and which thus on the one hand improves the spatial resolution during scanning of a surface and which on the other hand generates a control signal which changes in a monotonic manner with decreasing distance between the probe and the surface.

According to the invention this object is achieved by a method according to claims 1 and 3, respectively.

According to the invention, neither the change of the amplitude of the oscillation of the basic frequency of the cantilever nor the change of the frequency or the phase of the basic oscillation of the cantilever is used as the control signal, but rather the amplitude or the phase of higher harmonic oscillations of the cantilever. In this respect it is beneficial that the amplitudes of the higher harmonics increase monotonically with decreasing distance between the probe and the sample and hence represent a monotonic control system. Consequently, an essential drawback of the prior systems is avoided which work with a non-monotonic control signal. Moreover, it is beneficial that the spatial resolution is improved. The use of the phase of the higher harmonics makes sense if dissipation occurs in the interaction between the probe and the sample.

In the following it will be assumed that the probe is a tip. The amplitude $a_n$ of the order n is given by:

$$a_n = \frac{2}{\pi k} \frac{1}{1-n^2} \frac{1}{n!!} A^n \int_{-1}^{1} \frac{d F_{ts}^n(z+Au)}{dz^n}(1-u^2)^{n-1/2}\,du.$$

Therein k is the spring constant of the cantilever, A is the amplitude of the basic oscillation, $F_{ts}$ is the force acting between the tip and the sample, z is the distance between the tip and the sample surface and u is the variable over which there is integrated. As it follows from the formula, the occurrence of higher harmonics is closely related to short-range interactions. Thus, the interaction of the outermost front atom of the tip with the sample surface has a significantly stronger impact on the amplitude of a higher order harmonic than the contribution of rearward tip atoms. As a result, the spatial resolution of the force microscope is significantly enhanced and in addition a control signal is generated which increases monotonically with decreasing distance between the tip and the probe when the amplitudes of higher harmonic oscillations are measured.

Generally, both single amplitudes of higher harmonics of an order n or combinations of several amplitudes of different orders n can be measured and evaluated, as will be explained in more detail hereinafter. In the combination measurement either the root of the square sum of the amplitudes may be determined (integrative measurement over different orders n) or it may be a linear combination of single amplitudes (combination of separately measured different orders n). The measurement of the oscillation amplitude of higher harmonics may be used both for a modified AM method, i.e. with oscillation excitation at constant frequency near the basic frequency, and for a modified FM method, i.e. excitation at variable frequency by means of positive oscillation feedback.

In the modified AM method the excitation frequency is between a lower limit formed by the basic resonance frequency minus the Q-factor of the cantilever divided by the basic resonance frequency, and an upper limit formed by the basic resonance frequency plus the Q-factor of the cantilever divided by the basic resonance frequency.

Further preferred embodiments of the invention are given in the dependent claims.

Figure 2:
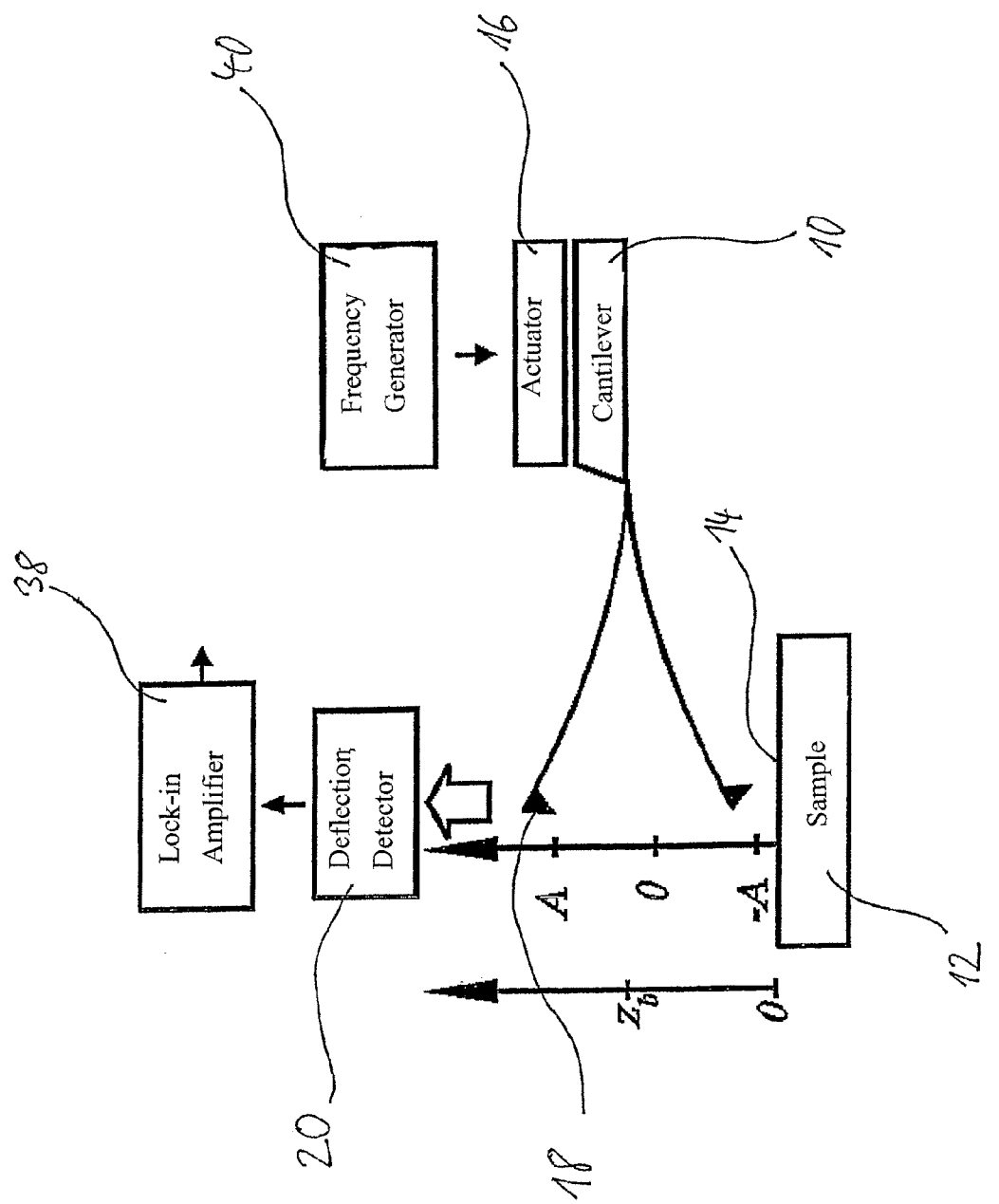

In the following, examples of the invention will be explained by reference to the attached drawings, wherein:

FIG. 1 is a schematic view of a scanning force microscope with a method according to the invention for scanning a surface by means of a modified FM method; and FIG. 2 is a schematic view of a scanning force microscope with a method according to the invention for scanning a surface by means of a modified AM method.

As an embodiment of the invention hereinafter a modified FM method according to the invention shall be explained in more detail by reference to FIG. 1. As in conventional FM methods, here a cantilever 10 comprising at its end facing the sample 12 a probe in the form of a tip 18 is caused to oscillate in a resonant fashion by positive feedback. The cantilever 10 essentially oscillates along a z-axis which is perpendicular to the sample surface 14. The oscillation comprises in addition to the basic resonance oscillation of the cantilever 10 which is force-coupled to the sample 12 via the tip 18 at least one higher harmonic of this basic resonance. Usually the amplitudes of the higher harmonics decrease sharply with increasing order.

According to the invention, rather than the shift of the basic resonance frequency of the cantilever 10 caused by an interaction and the corresponding force-coupling with the sample surface, the amplitude of at least one of the excited higher harmonics of the cantilever 10 is measured. Amplitude measurement is effected by the deflection detector 20 which is schematically shown. This detector, as in the case of known AFM microscopes, may consist of a photo-detector and a light beam. The light beam is deflected by the cantilever 10 onto the photo-detector, wherein the deflection is modulated by the oscillation of the cantilever. The deflection signal obtained in this manner first is passed through a band-pass filter, which cuts off unwanted frequencies, and subsequently it is divided up into two output signals. One of the output signals is passed through a phase advancer 26 to an analogue multiplier 32. A second signal is passed through a root-mean-square rectifier 28 to a PI controller (proportional-integral controller) 30 and is compared there to an amplitude setpoint value, and an output signal calculated therefrom is passed to the analogue multiplier 32 which multiplies both signals and supplies an output signal to an actuator 16 which amplifies the oscillation of the cantilever 10. The phase advancer 26 provides for a phase shift close to $\pi/2$ between the oscillation of the cantilever 14 and the driving actuator 16, whereby a positive feedback is optimized.

As already mentioned, rather than the frequency shift of the basic resonance of the oscillation of the cantilever due to the interaction with the surface, according to the invention the amplitude of at least one higher harmonic of the cantilever 10 is measured. Therein the amplitudes of all higher harmonics may be determined in total by passing a portion of the oscillation signal which is obtained from the analogue multiplier 32 through a high-pass filter 32, the lower cut-off frequency $f_u$ is above the resonance frequency of the coupled system consisting of the cantilever and the probe by at least its selectivity (the lower cut-off frequency $f_u$, for example, may correspond to about the 1.5-fold of the resonance frequency). This filtered signal then is supplied into a root-mean-square rectifier 36, the output of which represents the control signal for the distance control. Thus, one integrates over the amplitudes of the higher harmonics in order to obtain a control signal. Such a measurement provides for the root of the square sum of the individual amplitudes of the higher harmonics as the result or the control signal, respectively.

According to an alternative embodiment individual higher harmonics are addressed, as it is, for example, possible with a lock-in amplifier which is adjusted to the frequency of a single overtone oscillation. Since this frequency depends on the interaction of the probe with the sample and hence may vary during the measurement, the frequency to which the lock-in amplifier is set is determined from the measured present basic resonance frequency of the cantilever and hence is changed during the measurements, if necessary. The high-pass filter 34 and the root-mean-square rectifier 36 of FIG. 1 in this embodiment of the invention then are substituted by the lock-in amplifier. The typical variation of the resonance frequency during the measurement is less than 3%.

In order to obtain linear combinations of the amplitudes of different higher harmonics as the measurement signal or the control signal, respectively, the individual amplitudes first may be measured separately (for example, by dedicated lock-in amplifiers for each amplitude or by a multi-channel lock-in amplifier) and then may be combined linearly, wherein individual amplitudes may be weighted differently.

A further alternative embodiment of the invention is described by reference to FIG. 2. In contrast to the embodiment according to FIG. 1 here the cantilever 10 is driven by a frequency generator 40 at a fixed frequency close to the resonance frequency of the basic oscillation of the free cantilever 10, i.e. which is not force-coupled with the sample 12. Accordingly, this is a modification according to the invention of a scanning force microscope in the AM mode. The frequency generator 40 in this case controls an actuator 16 which also here controls the cantilever 10. A deflection detector 20 measures, as in the embodiment of FIG. 1, again the deflection of the cantilever 10, wherein in contrast to the prior art here the amplitudes of higher harmonics of n-th order having frequencies corresponding to an integer multiple (n-fold) of the excitation frequency are measured for distance control. Hence, in this case the frequencies of the higher harmonics are not integer multiples of the basic resonance frequency (first fundamental oscillation), but rather they are integer multiples of the excitation frequency. A measurement of all higher harmonics in total can be carried-out, for example, as mentioned above, by means of a high-pass filter and a root-mean-square rectifier. For the alternative measurement of a single higher harmonic a lock-in amplifier 38, rather than a high-pass filter and a root-mean-square rectifier, is coupled to the deflection detector 20, as shown. As explained above with regard to FIG. 1, linear combinations of different higher harmonics may be determined as the measurement signal or the control signal, respectively.

In all embodiments the amplitude of the basic resonance oscillation of the cantilever or the probe, respectively, is preferably kept below 10 nm, or even below 1 nm, if necessary, since the mentioned high sensitivity of the higher harmonics is valid only for relatively small amplitudes. The quality factor Q of the cantilever preferably is at least 300, the basic resonance frequency $f_0$ preferably is below 1 MHz, and the spring constant k of the cantilever preferably is more than 10 N/m.

The invention claimed is:

1. A method for scanning a surface (12) in a dynamic mode, wherein a cantilever (10) provided with a probe (18) is force-coupled to the surface and is made to oscillate in a resonant fashion using positive feedback, wherein the resonant oscillation contains at least one higher harmonic whose frequency represents an integer multiple of the basic resonance frequency of the cantilever which is force-coupled to the surface, characterized in that the amplitude or the phases of the at least one higher harmonic oscillation is determined as a control variable in order to regulate the distance between the probe (18) and the surface (14).

2. The method of claim 1, characterized in that the resonant oscillation contains several of the higher harmonic oscillations, wherein a combination of the amplitudes of all of these higher harmonic oscillations is used to determine the control variable for regulating the distance between the probe (18) and the surface (14).

3. The method of claim 2, characterized in that the square sum of the amplitudes of the higher harmonic oscillations or a quantity derived therefrom, in particular the root thereof, is determined and is used as the control variable for regulating the distance between the probe (18) and the surface (14).

4. The method of claim 2, characterized in that the amplitude of each of the higher harmonic oscillations is determined separately and a linear combination of the determined amplitudes is used as the control variable for regulating the distance between the probe (18) and the surface (14).

5. The method of claim 3, characterized in that the amplitude of the plurality of the higher harmonic oscillations is measured by means of a high-pass filter (34) whose lower cut-off frequency is above the frequency of the basic resonance oscillation of the cantilever (10) by at least its sensitivity.

6. The method of claim 1, characterized in that the probe (18) consists of a tip.

7. Method of claim 1, characterized in that the amplitude of the at least one higher harmonic oscillation is measured by means of a lock-in amplifier (38) which is set to the corresponding frequency.

8. The method of claim 7, if referring back to claim 1, characterized in that the frequency to which the lock-in amplifier (38) is set is determined in-situ from the continuously measured basic resonance frequency of the cantilever (10).

9. The method of claim 1, characterized in that the amplitude of the basic resonance oscillation of the cantilever (10) is kept below 10 nm.

10. The method of claim 1, characterized in that the Q-factor of the cantilever (10) is more than 300.

11. The method of claim 1, characterized in that the frequency of the basic resonance oscillation of the cantilever (10) is below 1 MHz.

12. The method of claim 1, characterized in that the spring constant of the cantilever (10) is more than 10 N/m.

13. A method for scanning a surface (14) in a dynamic mode, wherein a cantilever (10) provided with a probe (18) is force-coupled to the surface and is made to oscillate in a fashion that the oscillation contains at least one higher harmonic oscillation by excitation by means of an oscillation generator (16) exciting at a fixed frequency between the frequency of the basic resonance oscillation minus the frequency of the basic resonance oscillation divided by the Q-factor of the cantilever and the frequency of the basic resonance oscillation plus the frequency of the basic resonance oscillation of the free cantilever divided by the Q-factor of the cantilever, said at least one higher harmonic oscillation having a frequency which is an integer multiple of the excitation frequency of the oscillation generator, characterized in that the amplitude or the phase of the at least one higher harmonic oscillation is determined as a control variable in order to regulate the distance between the probe (18) and the surface (14).

14. The method of claim 13, characterized in that the oscillation contains a plurality of the higher harmonic oscillations, wherein a combination of the amplitudes of all of these higher harmonic oscillations is used in order to determine the control variable for regulating the distance between the probe (18) and the surface (14).

15. The method of claim 13, characterized in that the oscillation generator (16) is an electromechanical actuator.

16. The method of claim 13, characterized in that the amplitude of the oscillation of the cantilever (10) at the excitation frequency of the oscillation generator (16) is kept below 10 nm.

17. The method of claim 13, characterized in that the excitation frequency of the oscillation generator (16) is below 1 MHz.

* * * * *